United States Patent
Koehler

(10) Patent No.: US 9,544,387 B2
(45) Date of Patent: Jan. 10, 2017

(54) INDICATION OF URL PREREQUISITE TO NETWORK COMMUNICATION

(75) Inventor: Yannick Koehler, Lasalle (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 657 days.

(21) Appl. No.: 13/150,903

(22) Filed: Jun. 1, 2011

(65) Prior Publication Data
US 2012/0311150 A1    Dec. 6, 2012

(51) Int. Cl.
| H04L 29/08 | (2006.01) |
| H04L 29/06 | (2006.01) |
| H04W 12/06 | (2009.01) |
| H04L 29/12 | (2006.01) |
| H04W 88/08 | (2009.01) |

(52) U.S. Cl.
CPC ....... *H04L 67/2814* (2013.01); *H04L 61/2015* (2013.01); *H04L 63/168* (2013.01); *H04W 12/06* (2013.01); *H04W 88/08* (2013.01)

(58) Field of Classification Search
None
See application file for complete search history.

(56) References Cited

U.S. PATENT DOCUMENTS

| 6,041,357 | A  * | 3/2000  | Kunzelman et al. ......... 709/228 |
| 6,148,344 | A  * | 11/2000 | Bi ................................ 709/250 |
| 6,233,577 | B1 * | 5/2001  | Ramasubramani et al. |
| 6,308,212 | B1 * | 10/2001 | Besaw et al. ................ 709/228 |
| 6,516,316 | B1 * | 2/2003  | Ramasubramani et al. |
| 6,560,229 | B1 * | 5/2003  | Kadambi et al. ............. 370/392 |
| 6,567,852 | B2 * | 5/2003  | Besaw et al. ................. 709/228 |
| 6,587,880 | B1 * | 7/2003  | Saigo et al. .................. 709/225 |
| 6,611,348 | B1 * | 8/2003  | Chase et al. ................. 358/1.15 |
| 6,683,882 | B1 * | 1/2004  | Maufer et al. ................ 370/401 |
| 6,809,738 | B2 * | 10/2004 | Hubrecht et al. ............ 345/543 |
| 6,834,294 | B1 * | 12/2004 | Katz ............................. 709/203 |
| 6,961,776 | B1 * | 11/2005 | Buckingham et al. ....... 709/229 |
| 7,050,963 | B2 * | 5/2006  | Flavin ............................ 703/27 |
| 7,089,316 | B2 * | 8/2006  | Andersen et al. ........... 709/229 |
| 7,106,734 | B2 * | 9/2006  | Kadambi et al. ............. 370/389 |
| 7,194,761 | B1   | 3/2007  | Champagne |
| 7,222,361 | B2   | 5/2007  | Kemper |
| 7,290,288 | B2   | 10/2007 | Gregg et al. |
| 7,370,346 | B2   | 5/2008  | Congdon |
| 7,373,662 | B2   | 5/2008  | Foster et al. |
| 7,398,291 | B2 * | 7/2008  | Osias ........................... 709/203 |
| 7,412,224 | B2 * | 8/2008  | Kotola et al. ................ 455/403 |
| 7,415,022 | B2 * | 8/2008  | Kadambi et al. ............. 370/392 |
| 7,506,054 | B1   | 3/2009  | Fuh et al. |

(Continued)

OTHER PUBLICATIONS

Colubris Networks, Network Access Admin Guide, Oct. 2007, 102 pages.

*Primary Examiner* — Ninos Donabed
(74) *Attorney, Agent, or Firm* — Mannava & Kang, P.C.

(57) ABSTRACT

A network device includes a processor and a memory communicatively coupled to the processor. The memory stores instructions causing the processor, after execution of the instructions by the processor, to detect the presence of a client connecting to a network and send a packet to the client indicating that access to a Universal Resource Locator (URL) is a prerequisite to the client communicating over the network in response to the client connecting to the network. The packet includes the URL.

14 Claims, 7 Drawing Sheets

(56) References Cited

U.S. PATENT DOCUMENTS

| | | | |
|---|---|---|---|
| 7,523,197 B2* | 4/2009 | Castaneda et al. | 709/224 |
| 7,568,107 B1 | 7/2009 | Rathi et al. | |
| 7,805,489 B2* | 9/2010 | Roberts | 709/206 |
| 7,856,659 B2 | 12/2010 | Keeler et al. | |
| RE42,153 E * | 2/2011 | Hubbard et al. | 709/203 |
| 7,904,627 B2* | 3/2011 | James | 710/301 |
| 2002/0165971 A1* | 11/2002 | Baron | 709/228 |
| 2003/0189924 A1* | 10/2003 | Kadambi et al. | 370/360 |
| 2004/0039945 A1* | 2/2004 | Oda | 713/201 |
| 2004/0107364 A1* | 6/2004 | Shin | 713/201 |
| 2004/0267878 A1* | 12/2004 | Osias | 709/203 |
| 2005/0198493 A1* | 9/2005 | Bartas | 713/154 |
| 2006/0009996 A1* | 1/2006 | Lipscomb et al. | 705/1 |
| 2007/0110010 A1* | 5/2007 | Kotola et al. | 370/338 |
| 2007/0214256 A1* | 9/2007 | Castaneda et al. | 709/224 |
| 2007/0248085 A1* | 10/2007 | Volpano | 370/389 |
| 2007/0299918 A1* | 12/2007 | Roberts | 709/206 |
| 2008/0097858 A1 | 4/2008 | Vucina et al. | |
| 2008/0215677 A1* | 9/2008 | Osias | 709/203 |
| 2009/0007098 A1* | 1/2009 | Chevrette et al. | 717/177 |
| 2009/0144359 A1* | 6/2009 | Karlsen et al. | 709/203 |
| 2009/0183251 A1* | 7/2009 | Deinlein et al. | 726/12 |
| 2009/0313261 A1* | 12/2009 | Corella | 707/10 |
| 2010/0070620 A1* | 3/2010 | Awadallah et al. | 709/224 |
| 2010/0077035 A1* | 3/2010 | Li et al. | 709/206 |
| 2010/0223655 A1 | 9/2010 | Zheng | |
| 2010/0275249 A1 | 10/2010 | McCann et al. | |
| 2012/0265679 A1* | 10/2012 | Calman et al. | 705/43 |
| 2012/0265809 A1* | 10/2012 | Hanson et al. | 709/204 |

* cited by examiner

INDICATION OF URL PREREQUISITE TO NETWORK COMMUNICATION

BACKGROUND

An authentication process may or may not be a perquisite for a client connecting to a network prior to the client having access to the network. Typically, the client is not aware whether or not an authentication process is a prerequisite to attempting to access a network resource. In addition, if an authentication process is a prerequisite, an attempt to access a network resource may fail without providing the client with an indication as to why the attempted access failed. For example, an end-user may open their e-mail client in an airport that offers wireless internet service. If an authentication process is a prerequisite to use the airport's wireless internet service, however, the end-user may not be able to access their e-mail server to send or receive e-mail. The end-user may not be aware of the prerequisite authentication process until they open a browser.

DETAILED DESCRIPTION

In the following detailed description, reference is made to the accompanying drawings which form a part hereof, and in which is shown by way of illustration specific embodiments in which the disclosure may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Figure 1:
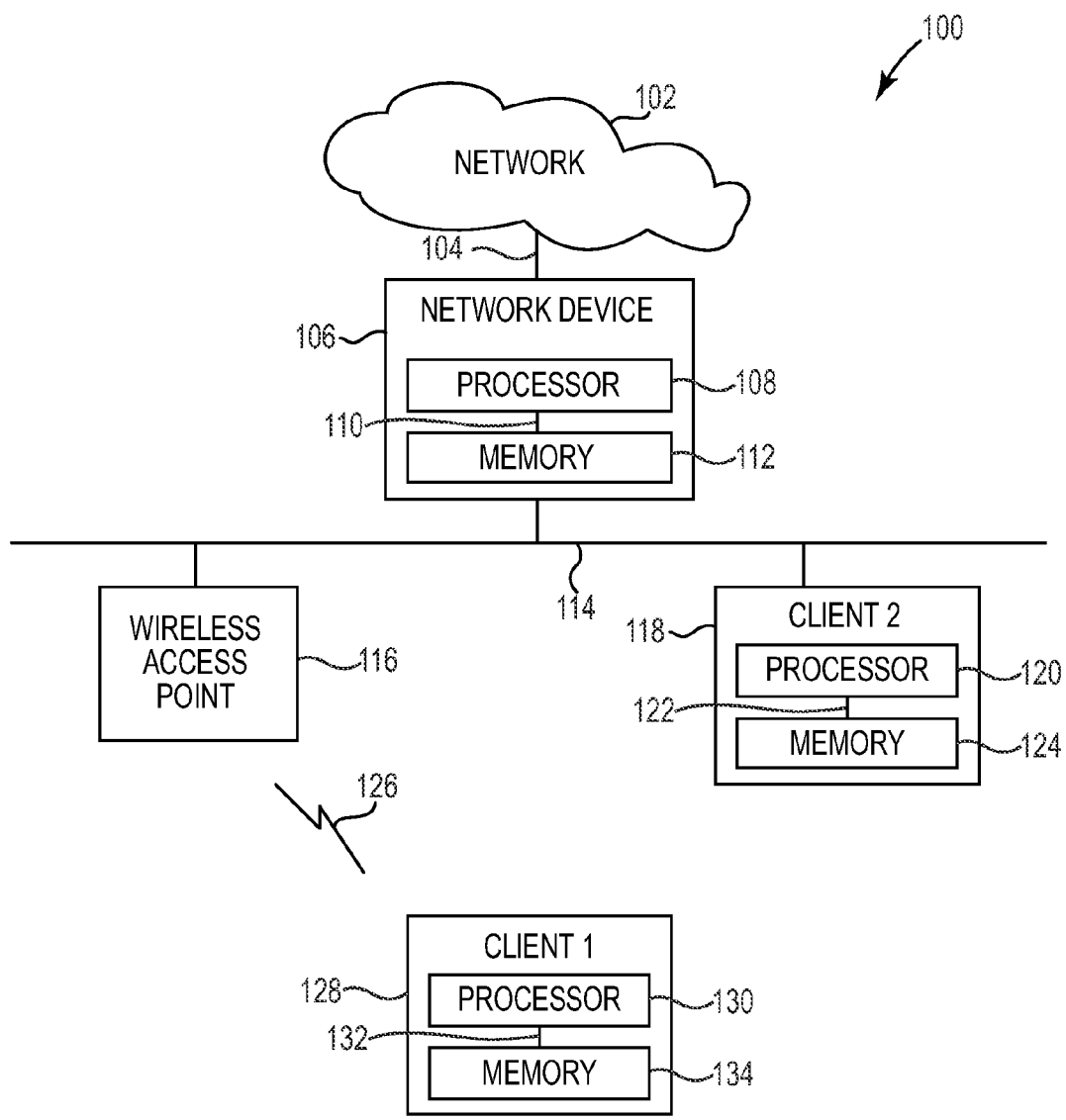
FIG. 1 is a block diagram illustrating one embodiment of a system.

FIG. 1 is a block diagram illustrating one embodiment of a system 100. System 100 includes a wide area network 102, a network device 106, a wireless access point 116, a first client 128, and a second client 118. Wide area network 102 is communicatively coupled to network device 106 through communication path 104. Network device 106 is communicatively coupled to wireless access point 116 and second client 118 through a local area network 114. Wireless access point 116 is communicatively coupled to first client 128 through wireless communication path 126.

When a client, such as first client 128 or second client 118, first connects to local area network 114, the client is notified that access to a Universal Resource Locator (URL) is a prerequisite to the client communicating over wide area network 102 through local area network 114. The notification is sent to the client in a DHCP packet, a Router Advertisement packet, a non IP packet, or in another suitable packet. In addition to the standard fields, the packet also includes the URL. In one embodiment, in addition to the URL, the packet also includes a network identifier. The network identifier identifies local area network 114 and the URL identifies a server page that the client needs to access. The notification of the prerequisite URL access enables a client to perform any prerequisite process immediately upon connecting to local area network 114 prior to attempting to communicate over wide area network 102.

In one embodiment, the URL identifies a server page where the client may complete a prerequisite authentication process prior to the client communicating over wide area network 102 through local area network 114. In other embodiments, the URL identifies a server page that provides information about the network not related to authentication.

Network 102 is a wide area network, such as the internet or other suitable network. Network device 106 is a router or other suitable device capable of passing communications between wide area network 102 and local area network 114. Network device 106 includes a processor 108 and a memory 112. Processor 108 is communicatively coupled to memory 112 through communication path 110. In one embodiment, memory 112 stores instructions executed by processor 108 for operating network device 106. Memory 112 includes any suitable combination of volatile and/or non-volatile memory, such as combinations of random access memory (RAM), read-only memory (ROM), flash memory, and/or other suitable memory.

Wireless access point 116 passes communications between clients, such as first client 128, and local area network 114 through a wireless connection, such as wireless communication path 126. First client 128 is any device capable of communicating with local area network 114 over a wireless connection, such as a computer (e.g., a laptop or tablet computer), a smartphone, a gaming system, or other suitable computing device. First client 128 includes a processor 130 and a memory 134. Processor 130 is communicatively coupled to memory 134 through communication path 132. In one embodiment, memory 134 stores instructions executed by processor 130 for operating first client 128. Memory 134 includes any suitable combination of volatile and/or non-volatile memory, such as combinations of RAM, ROM, flash memory, and/or other suitable memory.

Second client 118 is any device capable of communicating with local area network 114 over a wired connection, such as a computer (e.g., a laptop, desktop, or tablet computer) or other suitable computing device. Second client 118 includes a processor 120 and a memory 124. Processor 120 is communicatively coupled to memory 124 through communication path 122. In one embodiment, memory 124 stores instructions executed by processor 120 for operating second client 118. Memory 124 includes any suitable combination of volatile and/or non-volatile memory, such as combinations of RAM, ROM, flash memory, and/or other suitable memory.

When first client 128 or second client 118 initially connects to local area network 114, either through a wired connection or a wireless connection, network device 106 either discovers the client or the client notifies network device 106 of its presence. In one embodiment, after discovery of the client connection, network device 106 sends a packet to the client including a URL, which indicates that the client needs to access the URL prior to the client communicating over wide area network 102. In another embodiment, the packet sent to the client also includes a network identifier in addition to the URL. Upon receiving the packet, the client notifies the end-user of the client of the need to access the URL via a prompt or other suitable mechanism. After the notification of the prerequisite to access the URL, a web browser window is opened to the URL either automatically or in response to the end-user selecting an option to continue to the URL.

In another embodiment, after discovery of the client connection, network device 106 sends a packet to the client including a URL, which indicates that an authentication process, such as a HyperText Markup Language (HTML) authentication process, is a prerequisite to the client communicating over wide area network 102. In another embodiment, the packet sent to the client also includes a network identifier in addition to the URL. Upon receiving the packet, the client notifies the end-user of the client of the authentication process via a prompt or other suitable mechanism.

In one embodiment, after the notification of the authentication process to the end-user, a web browser window is opened to the URL in response to an end-user action where the end-user can complete the authentication process. In another embodiment, the web browser window is opened automatically to the URL for the end-user to complete the authentication process. The authentication process may include entering a username and password or other suitable authentication process.

Compared to conventional methods, this method of client authentication may provide a more integrated approach to the end-user. In addition, all non-HTML related communications may be blocked prior to the end-user authenticating themselves. With this method, the client knows in advance that a network authentication process is a prerequisite to attempting to access a network resource over the network.

Figure 2:
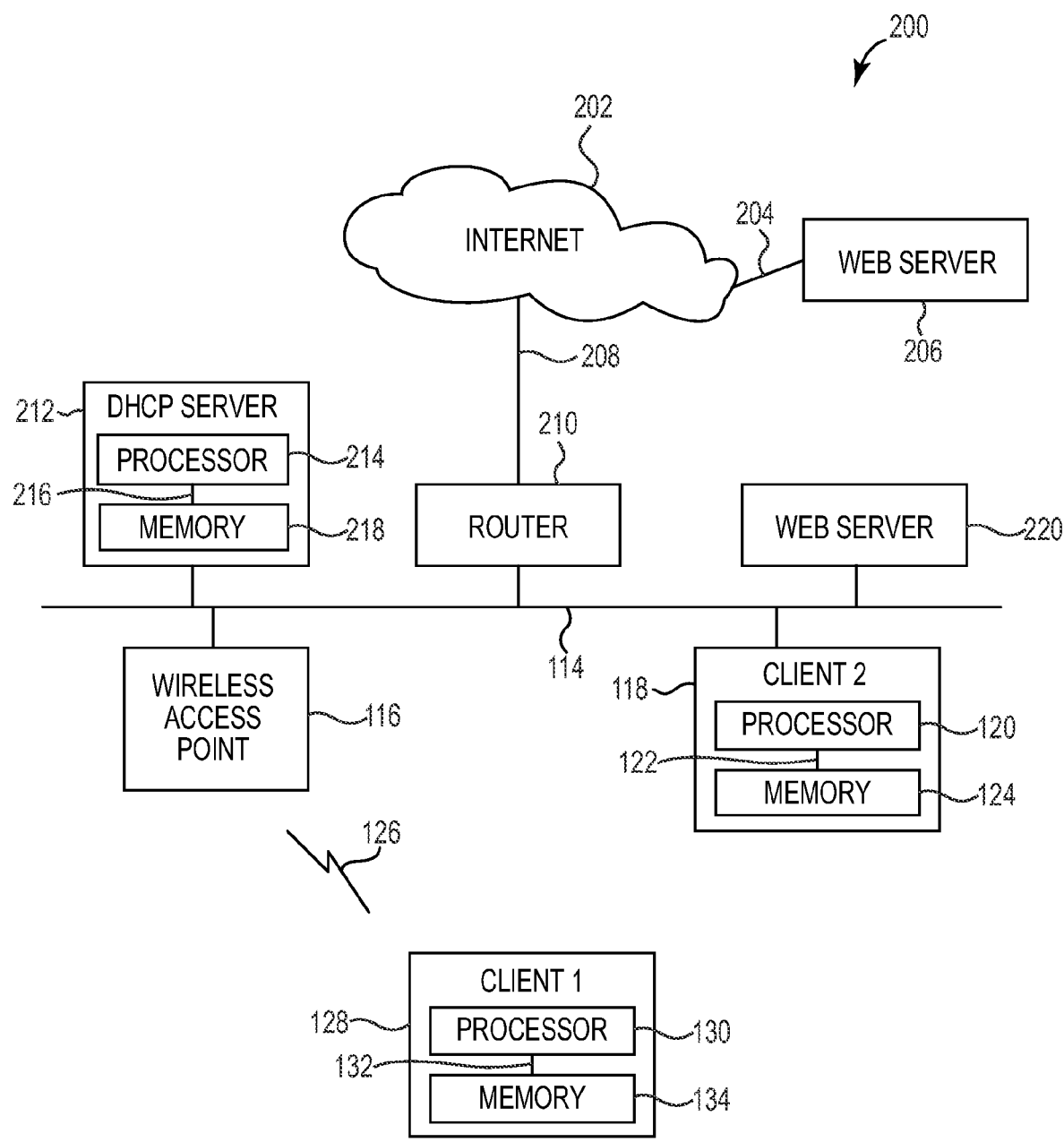
FIG. 2 is a block diagram illustrating another embodiment of a system.

FIG. 2 is a block diagram illustrating another embodiment of a system 200. System 200 includes an internet 202, web servers 206 and 220, a router 210, a Dynamic Host Configuration Protocol (DHCP) server 212, wireless access point 116, first client 128, and second client 118. Internet 202 is communicatively coupled to web server 206 through communication path 204 and to router 210 through communication path 208. Router 210 is communicatively coupled to wireless access point 116, DHCP server 212, web server 220, and second client 118 through local area network 114. Access point 116 is communicatively coupled to first client 128 through wireless communication path 126.

DHCP server 212 includes a processor 214 and a memory 218. Processor 214 is communicatively coupled to memory 218 through communication path 216. In one embodiment, memory 218 stores instructions executed by processor 214 for operating DHCP server 212. Memory 218 includes any suitable combination of volatile and/or non-volatile memory, such as combinations of RAM, ROM, flash memory, and/or other suitable memory.

In this embodiment, when first client 128 or second client 118 initially connects to local area network 114, either through a wired connection or a wireless connection, DHCP server 212 and/or router 210 either discovers the client or the client notifies DHCP server 212 and/or router 210 of its presence. In one embodiment, after discovery of the client connection, DHCP server 212 and/or router 210 sends a packet to the client including a URL, which indicates that the client needs to access the URL prior to the client communicating over internet 202. In another embodiment, the packet sent to the client also includes a network identifier in addition to the URL. Upon receiving the packet, the client notifies the end-user of the client of the prerequisite to access the URL via a prompt or other suitable mechanism. After the notification of the prerequisite to access the URL, a web browser window is opened to the URL either automatically or in response to the end-user selecting an option to continue to the URL.

In another embodiment, after discovery of the client connection, DHCP server 212 and/or router 210 sends a packet to the client including a URL, which indicates that an authentication process, such as a HTML authentication process, is a prerequisite to the client communicating over internet 202. In another embodiment, the packet sent to the client also includes a network identifier in addition to the URL. Upon receiving the packet, the client notifies the end-user of the client of the authentication process via a prompt or other suitable mechanism.

In one embodiment, after the notification of the authentication process to the end-user, a web browser window is opened to the URL in response to an end-user action where the end-user can complete the authentication process. In one embodiment, the web browser window is opened automatically to the URL for the end-user to complete the authentication process. The URL may access web server 220 connected to local area network 114 or web server 206 connected to internet 202. The authentication process may include entering a username and password or other suitable authentication process.

Figure 3:
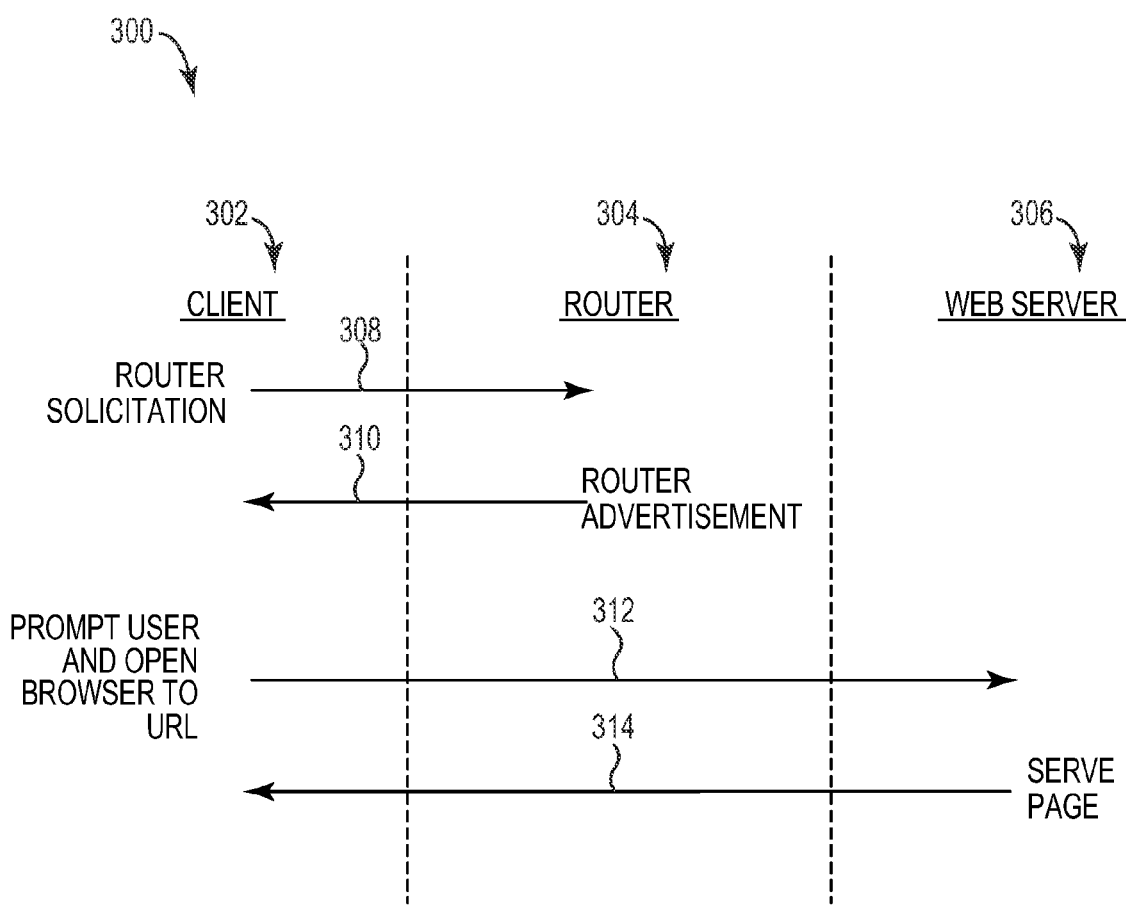
FIG. 3 is a flow diagram illustrating one embodiment of a communication sequence between a client and network devices when the client initially connects to a network.

FIG. 3 is a flow diagram illustrating one embodiment of a communication sequence 300 between a client and network devices when the client initially connects to a network. The communication sequence involves a client 302, a router 304, and a web server 306. In one embodiment, communication sequence 300 is applicable to a non IP network, such as an internetwork packet exchange (IPX) network. In this embodiment, client 302 may be first client 128 or second client 118 previously described and illustrated with reference to FIGS. 1 and 2. Router 304 may be network device 106 previously described and illustrated with reference to FIG. 1 or router 210 previously described and illustrated with reference to FIG. 2. Web server 306 may be web server 206 or web server 220 previously described and illustrated with reference to FIG. 2.

In this embodiment, when client 302 initially connects to a network, such as local area network 114 previously described and illustrated with reference to FIGS. 1 and 2, client 302 sends a router solicitation to router 304 as indicated at 308. In one embodiment, the router solicitation is a non IP packet requesting information about any network requirements. In another embodiment, client 302 is discovered by router 304 by reception of a management frame or data frame from client 302 that allows router 304 to detect a new source address based on an internal table, such as an Address Resolution Protocol (ARP) table, a bridge association table, or a wireless association table.

In response to discovering client 302 or in response to receiving the router solicitation from client 302, router 304 responds with a Router Advertisement packet as indicated at 310. The Router Advertisement packet includes a URL indicating that client 302 needs to access the URL prior to communicating over the network. In one embodiment, the Router Advertisement packet also includes a network identifier. In another embodiment, the Router Advertisement packet including the URL indicates where client 302 may perform an authentication process.

In response to receiving the router advertisement packet, client 302 prompts the end-user and opens a browser to the URL at web server 306 as indicated at 312. In response to client 302 opening the browser to the URL at web server 306, web server 306 responds to client 302 with the requested page as indicated at 314. Client 302 may then complete any prerequisite process, such as an authentication process, and gain access to the network.

In one embodiment, client 302 takes precautions when opening the URL to ensure that the destination is valid unless the destination provides a HyperText Transfer Protocol Secure (HTTPS) connection. The precautions may include restricting access to cookies, ensuring that no referrer that is used on any current browser window gets accessible to the URL, and/or other suitable precautions. By using precautions when opening the URL, any damage to client 302 will be minimized if the URL is spoofed.

Figure 4:
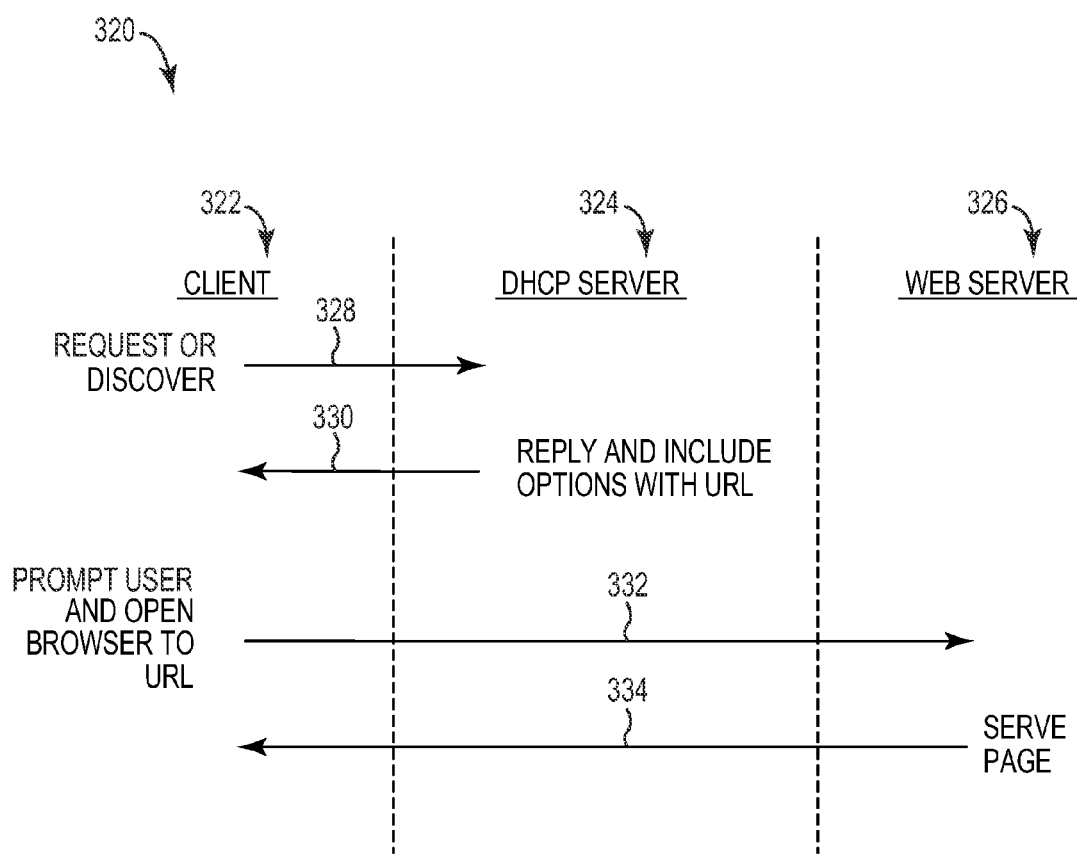
FIG. 4 is a flow diagram illustrating another embodiment of a communication sequence between a client and network devices when the client initially connects to a network.

FIG. 4 is a flow diagram illustrating another embodiment of a communication sequence 320 between a client and network devices when the client initially connects to a network. The communication sequence involves a client 322, a DHCP server 324, and a web server 326. In one embodiment, communication sequence 320 is applicable to Internet Protocol version 4 (IPv4). In this embodiment, client 322 may be first client 128 or second client 118 previously described and illustrated with reference to FIGS. 1 and 2. DHCP server 324 may be network device 106 previously described and illustrated with reference to FIG. 1 or DHCP server 212 previously described and illustrated with reference to FIG. 2. Web server 326 may be web server 206 or web server 220 previously described and illustrated with reference to FIG. 2.

In this embodiment, when client 322 initially connects to a network, such as local area network 114 previously described and illustrated with reference to FIGS. 1 and 2, client 322 sends a DCHP request to DHCP server 324 as indicated at 328. In another embodiment, DHCP server 324 discovers client 322 without client 322 having to send the DHCP request. In response to receiving the DHCP request from client 322 or discovering client 322, DHCP server 324 responds with a DHCP reply packet as indicated at 330. The DHCP reply packet includes the standard DCHP reply packet fields and an option field including a URL indicating that client 322 needs to access the URL prior to communicating over the network. In one embodiment, the DHCP reply packet also includes an option field including a network identifier. In another embodiment, the DHCP reply packet including the URL indicates where client 322 may perform an authentication process.

In response to receiving the DHCP reply packet, client 322 prompts the end-user and opens a browser to the URL at web server 326 as indicated at 332. In response to client 322 opening the browser to the URL at web server 326, web server 326 responds to client 322 with the requested page as indicated at 334. Client 322 may then complete any prerequisite process, such as an authentication process, and gain access to the network.

Figure 5:
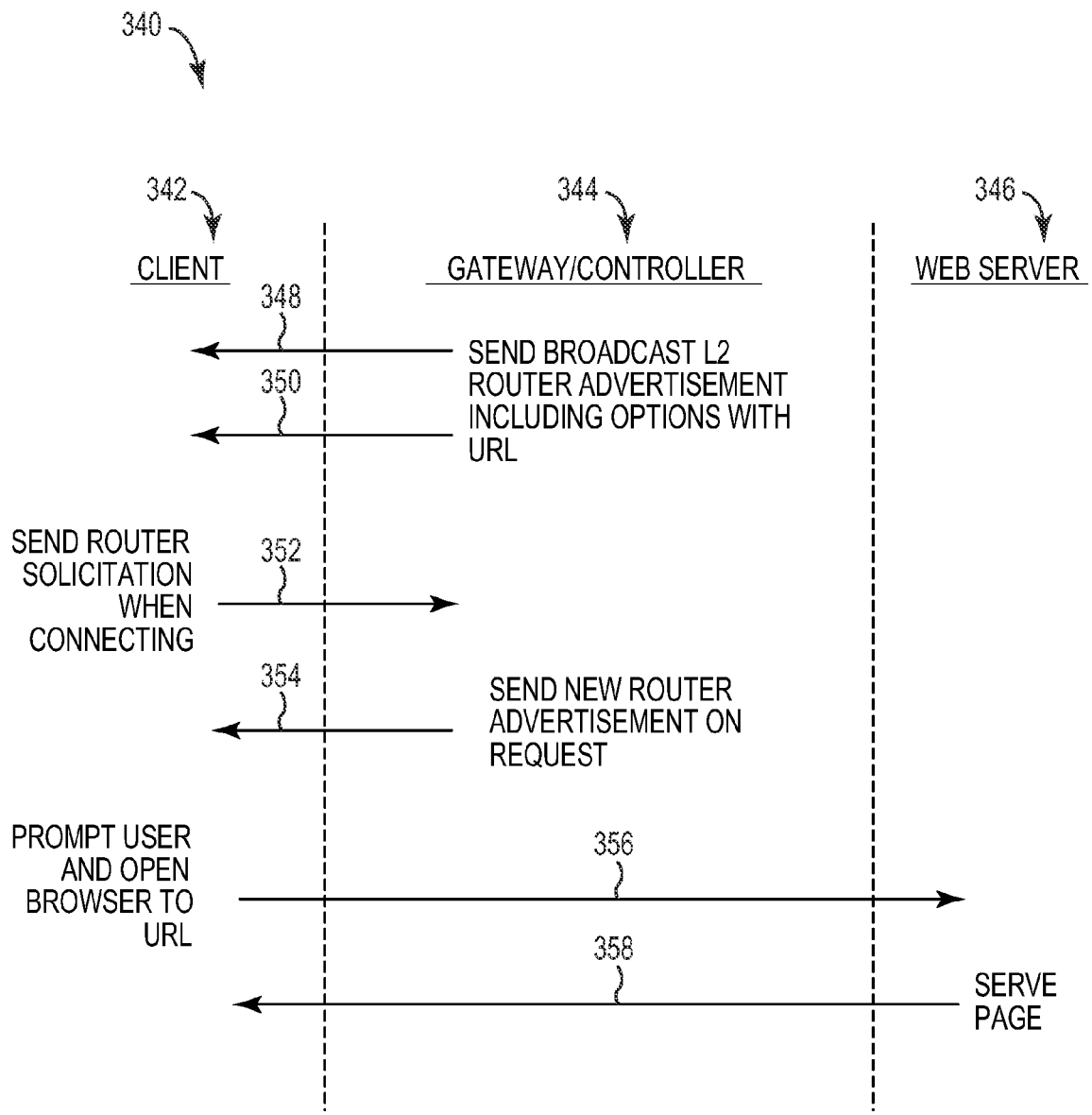
FIG. 5 is a flow diagram illustrating another embodiment of a communication sequence between a client and network devices when the client initially connects to a network.

FIG. 5 is a flow diagram illustrating another embodiment of a communication sequence 340 between a client and network devices when the client initially connects to a network. The communication sequence involves a client 342, a gateway/controller 344, and a web server 346. In one embodiment, communication sequence 340 is applicable to Internet Protocol version 6 (IPv6). In this embodiment, client 342 may be first client 128 or second client 118 previously described and illustrated with reference to FIGS. 1 and 2. Gateway/Controller 344 may be network device 106 previously described and illustrated with reference to FIG. 1 or router 210 previously described and illustrated with reference to FIG. 2. Web server 346 may be web server 206 or web server 220 previously described and illustrated with reference to FIG. 2.

In this embodiment, when client 342 initially connects to a network, such as local area network 114 previously described and illustrated with reference to FIGS. 1 and 2, client 342 receives a Broadcast L2 Router Advertisement packet as indicated at 348 and 350. The Broadcast L2 Router Advertisement packet includes the standard Broadcast L2 Router Advertisement packet fields and an option field including a URL indicating that client 342 needs to access the URL prior to communicating over the network. In one embodiment, the Broadcast L2 Router Advertisement packet also includes an option field including a network identifier. In another embodiment, the Broadcast L2 Router Advertisement packet including the URL indicates where client 342 may perform an authentication process.

In one embodiment, upon connecting to the network, client 342 sends a router solicitation to gateway/controller 344 as indicated at 352. In response to receiving the router solicitation from client 342, gateway/controller 344 may send a new Router Advertisement packet to client 342 as indicated at 354. The new Router Advertisement packet also includes an option field including the URL. The new Router Advertisement packet may also include an option field including the network identifier.

In response to receiving the Broadcast L2 Router Advertisement packet or the new Router Advertisement packet, client 342 prompts the end-user and opens a browser to the URL at web server 346 as indicated at 356. In response to client 342 opening the browser to the URL at web server 346, web server 346 responds to client 342 with the requested page as indicated at 358. Client 342 may then complete any prerequisite process, such as an authentication process, and gain access to the network.

Figure 6:
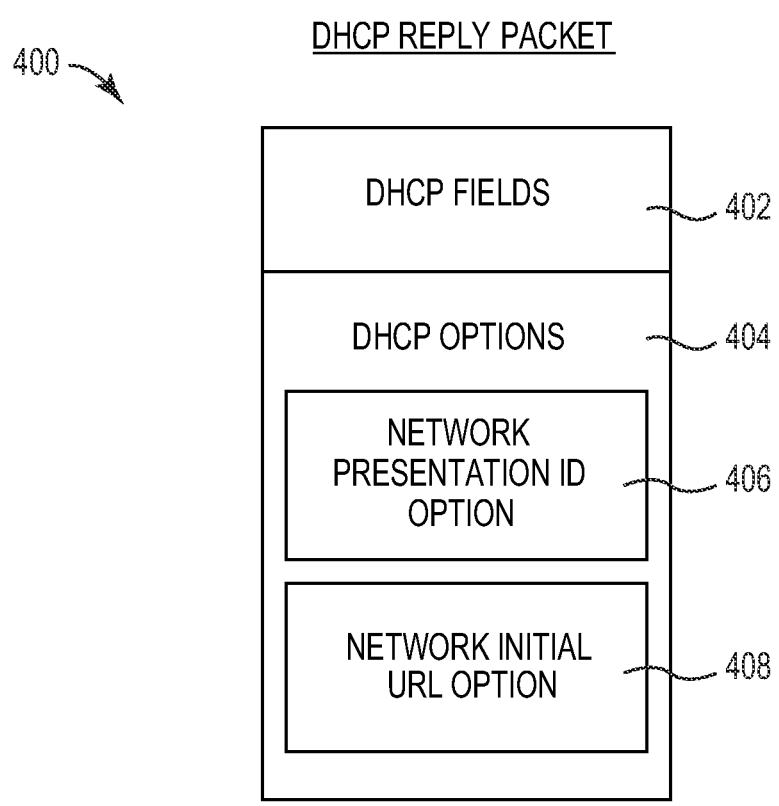
FIG. 6 is a block diagram illustrating one embodiment of a Dynamic Host Configuration Protocol (DCHP) reply packet.

FIG. 6 is a block diagram illustrating one embodiment of a DCHP reply packet 400. In one embodiment, DHCP reply packet 400 is included in the reply sent from DHCP server 324 to client 322 at 330 as previously described and illustrated with reference to FIG. 4. DCHP reply packet 400 includes the standard DHCP reply packet fields 402 and the standard DHCP option fields 404 as defined for IPv4. In this embodiment, one option field includes a network presentation ID option 406 and another option field includes a network initial URL option 408.

Network presentation ID option 406 is a network identifier and includes a string identifying the network and/or indicating that a URL needs to be accessed prior to accessing the network. For example, in one embodiment, network presentation ID option 406 could include the text "This network requires authentication first" or "Airport WiFi Access" or "Guest Access" or other suitable text. In one embodiment, the network presentation ID option 406 includes a network identifier (e.g., "Guest Access") that is used by the client to present a dialog such as "The network 'Guest Access' requires you to be authenticated using your browser. Click the login button to proceed to the login page."

Network initial URL option 408 is a URL indicating a page that needs to be accessed prior to communicating over the network. For example, in one embodiment, the network initial URL option 408 could include a web address such as "http:/www.mynetwork.com/login/" or other suitable URL. In one embodiment, the URL is hidden from the end-user. In another embodiment, a "details" button is provided in the dialog example above, which allows the end-user to see the URL.

Figure 7:
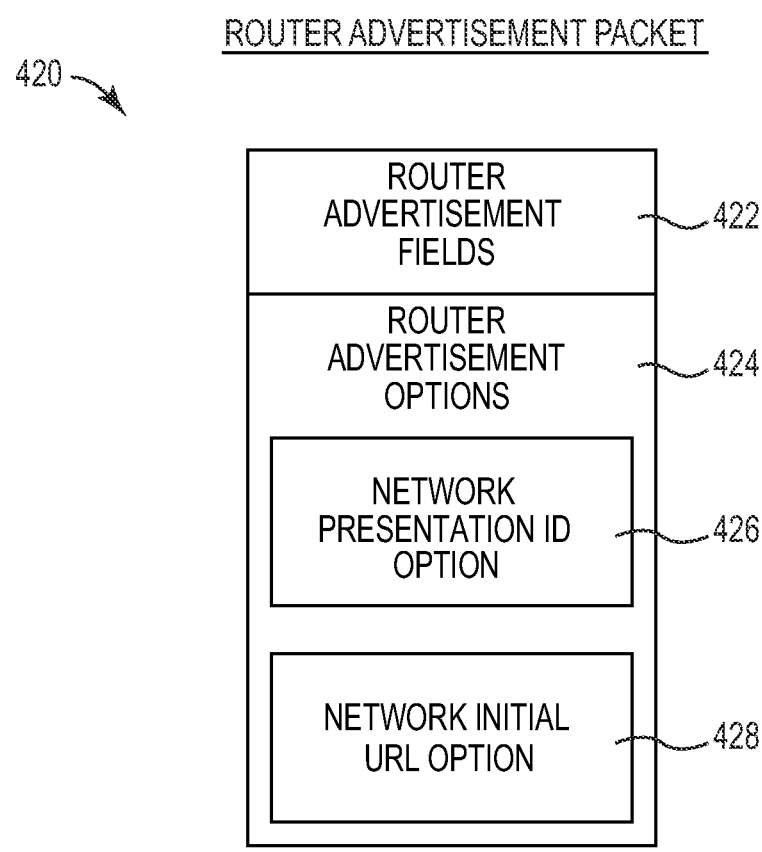
FIG. 7 is a block diagram illustrating one embodiment of a Router Advertisement packet.

FIG. 7 is a block diagram illustrating one embodiment of a Router Advertisement packet 420. In one embodiment, Router Advertisement packet 420 is included in the message sent from gateway/controller 344 to client 342 at 348, 350, and/or 354 as previously described and illustrated with reference to FIG. 5. Router Advertisement packet 420 includes the standard Router Advertisement fields 422 and the standard Router Advertisement option fields 424 as defined for IPv6. In this embodiment, one option field includes a network presentation ID option 426 and another option field includes a network initial URL option 428. Network presentation ID option 426 and network initial URL option 428 are similar to network presentation ID option 406 and network initial URL option 408, respectively, as previously described and illustrated with reference to FIG. 6 for DHCP reply packet 400.

Embodiments provide a system and method for clients to be notified of a prerequisite to access a URL in response to connecting to a network. The client accesses the URL to perform any prerequisite process, such as an authentication process, before the client is allowed to communicate over the network. In this way, the prerequisite process may be performed prior to the client attempting to communicate over the network to access network resources.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A network device comprising:
a processor; and
a memory communicatively coupled to the processor, the memory storing instructions which, when executed by the processor, cause the processor to:
detect a presence of a client when the client is initially connected to a network, and
send a packet to the client in response to the detection of the presence of the client when the client is initially connected to the network, prior to a communication packet being sent by the client over the network, and prior to the client being authenticated to communicate over the network, wherein the packet notifies the client that access to a Universal Resource Locator (URL) is a prerequisite for the client to communicate over the network, the packet including the URL.

2. The network device of claim 1, wherein the packet includes a network identifier.

3. The network device of claim 2, wherein the packet comprises a Dynamic Host Configuration Protocol (DHCP) packet comprising a first option field including the network identifier and a second option field including the URL.

4. The network device of claim 2, wherein the packet comprises a Router Advertisement packet comprising a first option field including the network identifier and a second option field including the URL.

5. The network device of claim 2, wherein the packet comprises a non Internet Protocol (IP) packet including the network identifier and the URL.

6. The network device of claim 1, wherein the packet indicates that an authentication process is a prerequisite for the client to communicate over the network.

7. The network device of claim 1, wherein the network device comprises one of a router and Dynamic Host Configuration Protocol (DHCP) server.

8. The network device of claim 1, wherein to detect the presence of the client connected to the network, the network device is to receive a management or data frame from the client.

9. A method for establishing communication over a network, the method comprising:
detecting, by a network device, a presence of a client when the client is initially connected to the network; and
sending, in response to detecting the presence of the client when the client is initially connected to the network, prior to a communication packet being sent by the client over the network, and prior to the client being authenticated to communicate over the network, a packet from the network device to the client that notifies the client that access to a Universal Resource Locator (URL) is a prerequisite authentication process for the client to communicate over the network, the packet including the URL.

10. The method of claim 9, wherein the packet includes a network identifier comprising a string indicating a name of the network.

11. The method of claim 10, wherein the packet comprises one of a Dynamic Host Configuration Protocol (DHCP) packet comprising a first option field including the network identifier and a second option field including the URL, a Router Advertisement packet comprising a first option field including the network identifier and a second option field including the URL, and a non Internet Protocol (IP) packet including the network identifier and the URL.

12. A non-transitory computer readable storage medium storing machine readable instructions which are executed by a processor to:
detect a presence of a client when the client is initially connected to a network; and
send a packet to the client in response to the detection of the presence of the client when the client is initially connected to the network, prior to a communication packet being sent by the client over the network, and prior to the client being authenticated to communicate over the network, wherein the packet notifies the client that access to a Universal Resource Locator (URL) is a prerequisite authentication process for the client to communicate over the network, the packet including the URL.

13. The non-transitory computer readable storage medium of claim 12, wherein the packet comprises a Dynamic Host Configuration Protocol (DHCP) packet comprising a first option field including a network identifier and a second option field including the URL.

14. The non-transitory computer readable storage medium of claim 12, wherein the packet comprises a Router Advertisement packet comprising a first option field including a network identifier and a second option field including the URL.

* * * * *